United States Patent
Kim et al.

(10) Patent No.: US 11,394,016 B2
(45) Date of Patent: Jul. 19, 2022

(54) PUNCHING SYSTEM FOR ELECTRODE BASE MATERIAL AND PUNCHING METHOD

(71) Applicant: LG Chem, Ltd., Seoul (KR)

(72) Inventors: Min Kyung Kim, Daejeon (KR); Sei Woon Oh, Daejeon (KR); Sun Hwak Woo, Daejeon (KR); Jin Seo Park, Daejeon (KR)

(73) Assignee: LG Energy Solution, Ltd.

( * ) Notice: Subject to any disclaimer, the term of this patent is extended or adjusted under 35 U.S.C. 154(b) by 148 days.

(21) Appl. No.: 16/649,439

(22) PCT Filed: Jul. 1, 2019

(86) PCT No.: PCT/KR2019/007984
§ 371 (c)(1),
(2) Date: Mar. 20, 2020

(87) PCT Pub. No.: WO2020/032393
PCT Pub. Date: Feb. 13, 2020

(65) Prior Publication Data
US 2020/0274136 A1 Aug. 27, 2020

(30) Foreign Application Priority Data
Aug. 10, 2018 (KR) .................. 10-2018-0093881

(51) Int. Cl.
*H01M 4/04* (2006.01)
*H01M 4/70* (2006.01)
(Continued)

(52) U.S. Cl.
CPC ....... *H01M 4/0404* (2013.01); *H01M 4/0433* (2013.01); *H01M 4/0435* (2013.01); *H01M 4/70* (2013.01); *H01M 10/0585* (2013.01)

(58) Field of Classification Search
None
See application file for complete search history.

(56) References Cited

U.S. PATENT DOCUMENTS 6,220,056 B1  4/2001  Ostendarp
2009/0068346 A1*  3/2009  Usui .................. H01M 4/0409
(Continued)

FOREIGN PATENT DOCUMENTS

CN  1186763 A  7/1998
CN  101489893 A  7/2009
(Continued)

OTHER PUBLICATIONS

Chinese Search Report for Application No. 201980004315.4, dated Jan. 8, 2021, 9 pages.
(Continued)

*Primary Examiner* — Tracy M Dove
(74) *Attorney, Agent, or Firm* — Lerner, David, Littenberg, Krumholz & Mentlik, LLP

(57) ABSTRACT

A punching system for an electrode base material is disclosed, in which the electrode base material coated with an active material on a surface of a collector is molded or cut in a predetermined shape. The punching system comprises: an unwinder on which the electrode base material in the form of a roll is mounted and around which the electrode base material is unwound; a punching device spaced a predetermined distance from the unwinder, the punching device being configured to mold or cut the electrode base material supplied from the unwinder in a predetermined shape; and a curl correcting device disposed between the unwinder and the punching device to inject or suction air onto a surface of the electrode base material while the electrode base material moves to the punching device so as (Continued)

to planarize the electrode base material. A punching method for an electrode base material is also disclosed.

10 Claims, 5 Drawing Sheets

(51) Int. Cl.
*B26D 5/00* (2006.01)
*H01M 10/0585* (2010.01)

(56) References Cited

U.S. PATENT DOCUMENTS

| | | |
|---|---|---|
| 2010/0039138 A1 | 2/2010 | Bertin |
| 2012/0031147 A1 | 2/2012 | Arai et al. |
| 2017/0259552 A1* | 9/2017 | Kang ................. B32B 38/1833 |
| 2018/0033697 A1 | 2/2018 | Suzuki et al. |
| 2018/0345310 A1* | 12/2018 | Watanabe ............. B05C 5/0254 |
| 2019/0081317 A1* | 3/2019 | Keil .......................... B05C 9/14 |

FOREIGN PATENT DOCUMENTS

| | | |
|---|---|---|
| CN | 102341211 A | 2/2012 |
| CN | 104973439 A | 10/2015 |
| CN | 105752686 A | 7/2016 |
| CN | 107407329 A | 11/2017 |
| JP | H11223521 A | 8/1999 |
| JP | 2008232793 A | 10/2008 |
| JP | 2009132524 A | 6/2009 |
| JP | 2013216429 A | 10/2013 |
| JP | 2015202932 A | 11/2015 |
| JP | 5850787 B2 | 2/2016 |
| JP | 2016100063 A | 5/2016 |
| JP | 2018043253 A | 3/2018 |
| KR | 20080018677 A | 2/2008 |
| KR | 100885590 B1 | 2/2009 |
| KR | 20110017761 A | 2/2011 |
| KR | 20110121870 A | 11/2011 |
| KR | 20120057437 A | 6/2012 |
| KR | 101508529 B1 | 4/2015 |
| KR | 20150040480 A | 4/2015 |
| KR | 20150089803 A | 8/2015 |
| KR | 20150118533 A | 10/2015 |
| KR | 20150141411 A | 12/2015 |
| KR | 101700113 B1 | 1/2017 |
| KR | 20170048757 A | 5/2017 |

OTHER PUBLICATIONS

International Search Report for PCT/KR2019/007984 dated Oct. 10, 2019.

* cited by examiner

PUNCHING SYSTEM FOR ELECTRODE BASE MATERIAL AND PUNCHING METHOD

CROSS-REFERENCE TO RELATED APPLICATION

The present application is a national stage entry under 35 U.S.C. § 371 of PCT/KR2019/007984, filed on Jul. 1, 2019, published in Korean, which claims priority from Korean Patent Application No. 10-2018-0093881, filed on Aug. 10, 2018, the disclosures of which are hereby incorporated herein by reference in their entireties.

TECHNICAL FIELD

The present invention relates to a punching system, which cuts an electrode base material coated with an active material on a surface of a collector into electrodes, each of which has a predetermined size, and processes an electrode tab, and a punching method thereof, and more particularly, to a punching system for an electrode base material, which is configured so that the electrode base material, which is unwound in a state of being wound in the form of a roll and supplied to a punching device, is supplied to the punching device in a flat state, and a punching method thereof.

BACKGROUND ART

Secondary batteries refer to batteries that are chargeable and dischargeable unlike primary batteries that are not chargeable. Such a secondary battery is widely used not only for portable devices such as a mobile phone, a notebook, and a camcorder but also for transportation such as an electric vehicle. As a result, the secondary battery is gradually expanding in a range of application.

In general, such a secondary battery has a structure comprising an electrode assembly having a structure in which electrodes (a negative electrode and a positive electrode) and a separator are alternately laminated, an electrolyte allowing ions to move to the electrodes, and a case in which the electrode assembly and the electrolyte are accommodated.

Also, a process of manufacturing the secondary battery is largely classified into an electrode plate process of manufacturing a positive electrode and a negative electrode, an assembly process of inserting an electrode assembly together with an electrolyte into a case after the electrode assembly is manufactured by using the positive electrode and the negative electrode, and a formation process of activating movement of ions of the electrode assembly. Each of the electrode plate process, the assembly process, and the formation process is divided into detailed processes.

Here, the electrode plate process comprises a mixing process of mixing a conductive material and a binder into an active material, a coating process of applying the mixed active material onto a collector, a press process of pressing the active material onto a surface of the collector, and a process of shearing the electrode so that the electrode in which the active material adheres to the surface of the collector is cut to a proper size to form an electrode tab. Here, a slitting process for cutting an electrode base material (with the active material applied on the surface of the collector) to a proper size and a notching process of shearing the electrode to form the electrode tab on one end of the cut electrode may be performed sequentially or simultaneously.

That is, the electrode base material continuously provided in a standardized size may pass through a slitting device and a notching device and be cut and processed so as to have a predetermined shape (for example, a shape in which the electrode tab protrudes to one side or the other side). The slitting device and the notching device may be separately provided or be configured to perform the cutting and processing in one device at the same time. Thus, a punching device for processing the electrode base material in a predetermined shape with upper and lower molds therebetween may be either a device for performing the slitting and the notching at the same time or any one of the slitting device and the notching device.

For the purpose of improving an energy density within a limited volume and also improving safety, a single-sided electrode 1 is laminated on the outermost layer (the uppermost layer and the lowermost layer) of the electrode assembly. A typical electrode has a structure in which an active material is applied to both surfaces of a collector. However, as illustrated in FIG. 1A, the single-sided electrode 1 has a structure in which an active material 1b is applied to only one surface of a collector 1a made of a metal material.

That is, when the single-sided electrode 1 is laminated on the outermost layer (so that the collector is disposed at the outermost side), the possibility of occurrence of short-circuit may be reduced to increase in safety even when an external impact is applied. In addition, as the active material 1b is not applied, the electrode assembly may be reduced in height to increase in the energy density.

However, the electrode base material to be manufactured as the single-sided electrode 1 is transferred to the punching process (the slitting process and the notching process) that is the next process in a state of being wound in the form of a roll in a state in which the active material is applied on only one surface of the electrode base material (by performing an active material drying process after the active material coating process). Also, as illustrated in FIG. 1B, the electrode base material 1 is unwound by rotation of a unwinder 2 and then supplied between an upper mold 3b and a lower mold 3a of a punching device 3.

However, while the electrode base material 1 is unwound, a curl (warpage) may occur due to a difference in surface energy between a surface, on which the active material is applied, and a surface on which the active material is not applied. The occurrence of the curl may also occur in the electrode base material on which the active material is applied on both surfaces. However, in the case of electrode base material on which the active material is applied to only one surface, a relatively larger curl may occur (the electrode base material is warped more severely).

The electrode base material 1 may be not closely attached to the upper mold 3b and the lower mold 3a by the curl when the electrode base material 1 enters the punching device 3 and thus be separated to cause defects.

DISCLOSURE OF THE INVENTION

Technical Problem

Therefore, a main purpose of the present invention is to provide a punching system for an electrode base material, in which the electrode base material is capable of entering a punching device in a flat state to restrict an occurrence of defects during a punching process, and a punching method.

Technical Solution

To achieve the above-described object, a punching system for an electrode base material, in which the electrode base material coated with an active material on a surface of a collector is molded or cut in a predetermined shape, according to the present invention comprises: an unwinder on which the electrode base material wound in the form of a roll is mounted and around which the electrode base material is unwound; a punching device disposed to be spaced a predetermined distance from the unwinder, the punching device being configured to mold or cut the electrode base material supplied from the unwinder in a predetermined shape; and a curl correcting device disposed between the unwinder and the punching device to inject or suction air onto a surface of the electrode base material while the electrode base material moves to the punching device so as to planarize the electrode base material.

The curl correcting device may comprise: an upper housing disposed above a moving path of the electrode base material; and a lower housing disposed below the moving path of the electrode base material, wherein a plurality of air passage holes through which the air is injected or suctioned may be provided in each of the upper housing and the lower housing.

The air passage holes may be individually connected to an air supply device configured to inject the air and a vacuum device configured to suction the air so that each of the air passage holes independently suctions or injects the air.

Furthermore, a distance measurement sensor configured to measure a distance from the surface of the electrode base material may be attached each of the upper housing and the lower housing, and the punching system may comprise a control unit configured to compare a distance between the upper housing and the surface of the electrode base material to a distance between the lower housing and the surface of the electrode base material, thereby calculating and monitoring a degree of warpage of the electrode base material.

The distance measurement sensor may be installed at at least two or more positions on each of the upper housing and the lower housing, and the control unit may compare a degree of the warpage, which is measured first, to a degree of the warpage, which is measured later, while the electrode base material moves to determine whether to suction or inject the air through each of the air passage holes.

The distance measurement sensor may comprise a laser distance measurement device which emits laser beam to the surface of the electrode base material to measure the distance.

The air injected onto the surface of the electrode base material may be injected as hot air having a temperature higher than room temperature, and the air passage holes may be disposed to form rows on a surface of each of the upper housing and the lower housing, which faces the electrode base material, in horizontal and vertical directions.

Furthermore, a punching method for an electrode base material according to the present invention may be additionally provided, and the punching method according to the present invention comprises: a step of supplying the electrode base material wound around a unwinder to a punching device; and a step of monitoring whether warpage of the electrode base material occurs during movement of the electrode base material to the punching device to inject or suction air onto a surface of the electrode base material when the warpage occurs so as to planarize the electrode base material.

The warpage of the electrode base material may be calculated by comparing a value measured by a distance measurement sensor disposed at a lower side to a value measured by a distance measurement sensor disposed at an upper side while the electrode base material moves, and the air injected onto the surface of the electrode base material may be injected as hot air having a temperature higher than room temperature.

Advantageous Effects

The present invention having the above-described configuration and technical features may comprise the curl correcting device for flattening the electrode base material by injecting or suctioning the air onto the surface of the electrode base material to reduce the occurrence of defects during the punching process.

In the curl correcting device, since the air is injected or suctioned from each of upper and lower sides of the electrode base material, the planarization may be realized more efficiently than the structure in which the air is injected from one side.

Also, since the distance measurement sensor for measuring the distance from the surface of the electrode base material is attached to each of the upper housing and the lower housing, and the control unit for calculating and monitoring the degree of the warpage of the electrode base material is provided, the air injection amount and the air suction amount may be actively controlled according to the degree of the warpage of the electrode base material.

Furthermore, the hot air may be injected onto the surface of the electrode base material to realize the planarization in the state in which the electrode base material is more flexible.

MODE FOR CARRYING OUT THE INVENTION

Figure 1A:
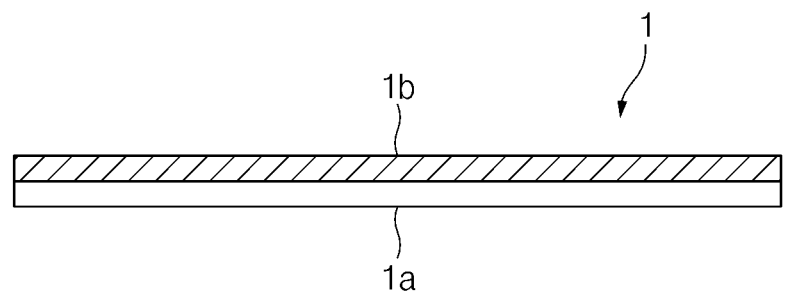
FIG. 1A is a side view of a single-sided electrode on which an active material is applied to only one surface of a collector.
Figure 1B:
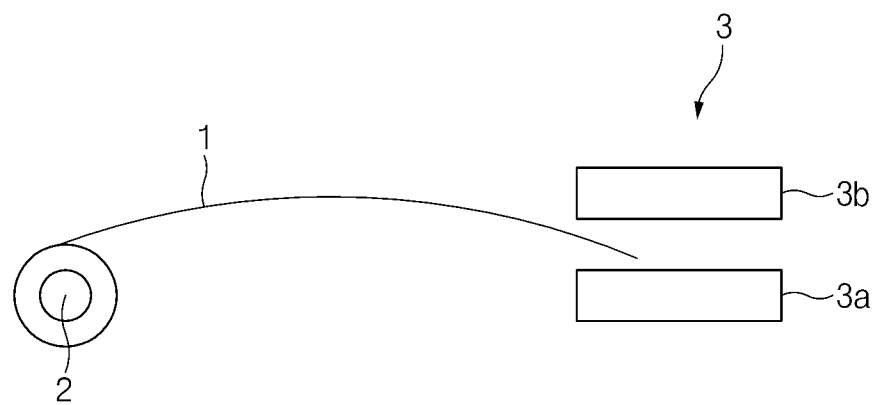
FIG. 1B is a side view illustrating a state in which an electrode base material enters a punching device in a state of being bent according to a conventional process.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

A punching system for an electrode base material, in which the electrode base material 1 coated with an active material on a surface of a collector is molded or cut in a predetermined shape is provided as a first embodiment, and a punching method for the electrode base material is provided as a second embodiment. Hereinafter, embodiments according to the present invention will be described with reference to the accompanying drawings.

First Embodiment

A punching system according to a first embodiment of the present invention comprises an unwinder 2, a punching device 3, and a curl correcting device 10.

Figure 2:
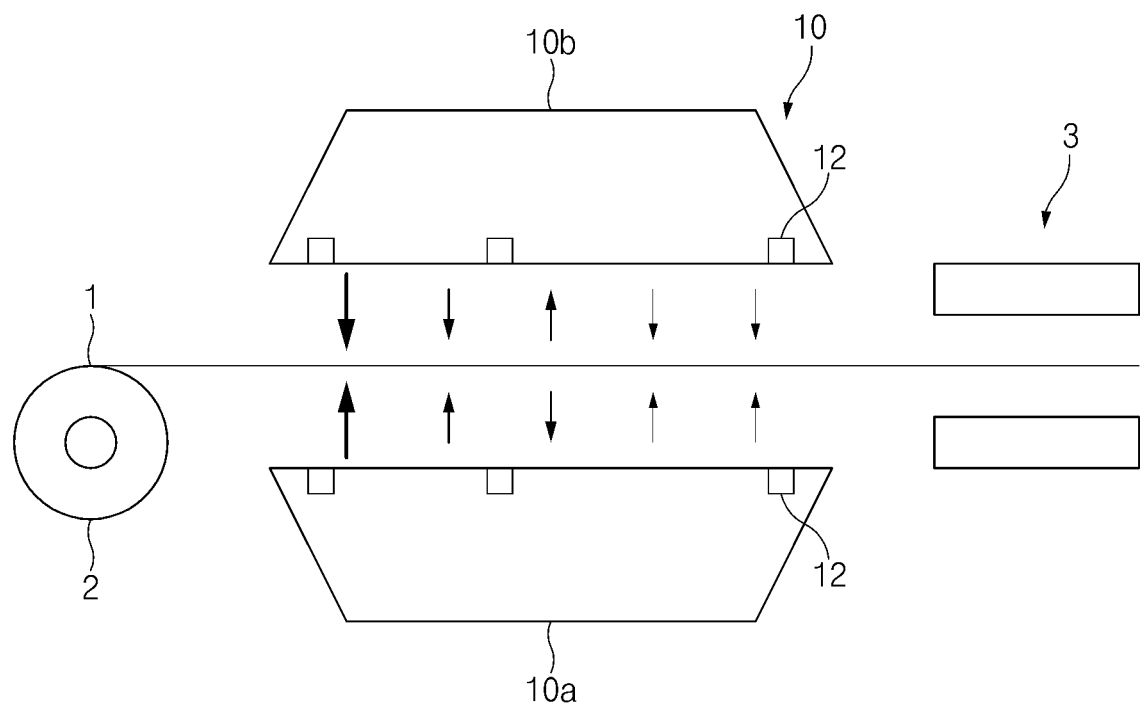
FIG. 2 is a simplified side view of a punching system according to a preferred embodiment of the present invention.
Figure 3:
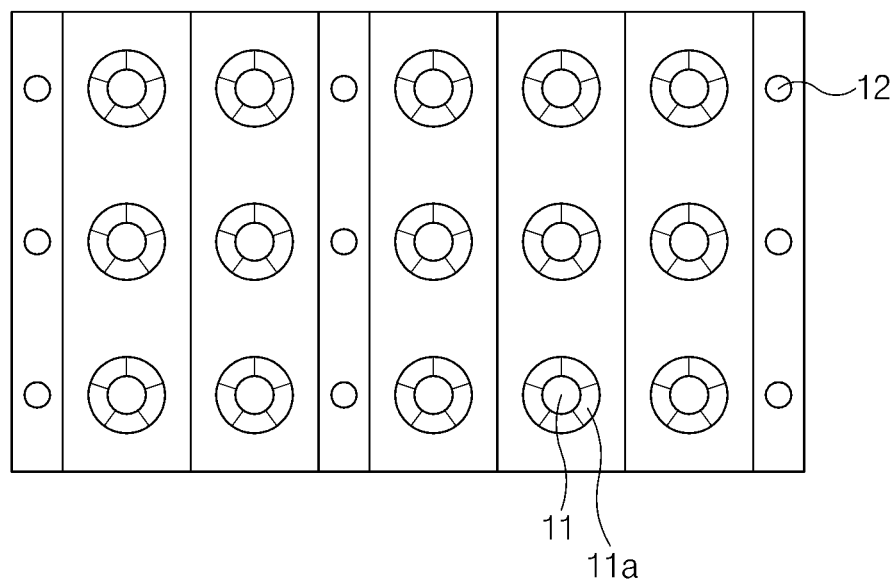
FIG. 3 is a view illustrating a bottom surface of an upper housing illustrated in FIG. 2.
Figure 4:
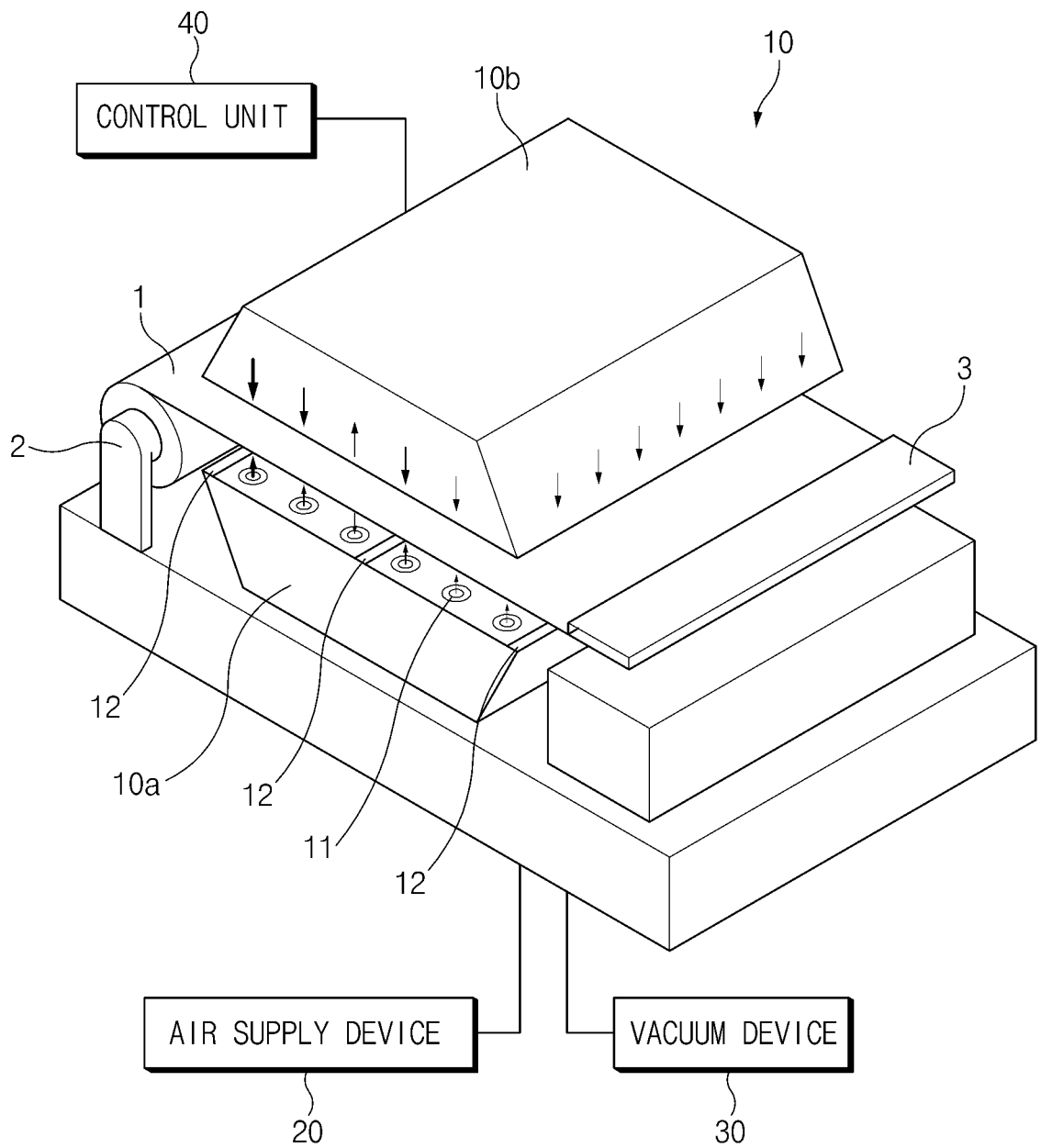
FIG. 4 is a simplified perspective view of a punching system according to a preferred embodiment of the present invention.

FIG. 2 is a simplified side view of the punching system according to a preferred embodiment of the present invention, FIG. 4 is a simplified perspective view of a punching system, and FIG. 3 is a view illustrating a bottom surface of an upper housing illustrated in FIG. 2 (the bottom surface of the upper housing is symmetrical to a top surface of the lower housing).

Referring to the attached drawings, an electrode base material 1 wound in the form of a roll is mounted on the unwinder 2, and the unwinder 2 rotates the electrode base material 1 (in a direction that is opposite to a winding direction) to continuously unwind the electrode base material 1 (here, although not shown in the drawings, an additional guide device, an auxiliary drawing device, or the like may be separately mounted to guide draw-out of the electrode base material).

Also, the punching device 3 is spaced a predetermined distance from the unwinder 2 and is configured to mold or cut the electrode base material 1 supplied from the unwinder 2 in a predetermined shape. The punching device 3 is configured to apply a pressure upward and downward so as to process the electrode base material 1 in a predetermined shape when the electrode base material 1 enters between an upper mold and a lower mold.

The curl correcting device 10 is disposed between the unwinder 2 and the punching device 3, i.e., a moving path of the electrode base material 1. Also, while the electrode base material 1 moves to the punching device 3, the curl correcting device 10 may inject or suction air onto top and bottom surfaces of the electrode base material 1 to planarize the electrode base material 1.

As illustrated in FIGS. 2 and 4, in the curl correcting device 10, an upper housing 10b is disposed above the moving path of the electrode base material 1, and a lower housing 10a is disposed below the moving path of the electrode base material 1. In all of the upper housing 10b and the lower housing 10a, a plurality of air passage holes 11 for injecting or suctioning air as illustrated in FIG. 3 are provided in each of surfaces (the bottom surface of the upper housing and the top surface of the lower housing) facing the surface of the electrode base material 1 to form a plurality of rows along a moving direction of the electrode base material 1 and in a width direction of the electrode base material 1.

As illustrated in FIG. 4, the air passage holes 11 are individually connected to an air supply device 20 that injects air and a vacuum device that suctions air (generates a negative pressure) to independently suction or inject the air. That is, each of the air passage holes 11 may be connected to the air supply device 20 to inject air or be connected to the vacuum device 30 to suction air. Also, the respective air passage holes 11 may individually inject or suction air. However, in the case of this configuration, since hoses and valves through which air flows are complicated in configuration, the injection and the suction may be performed at the same time through the air passage holes arranged in a row unit. In an embodiment of the present invention, although the air passage holes 11 are arranged to form the rows along the moving direction of the electrode base material 1 as illustrated in FIG. 3, the embodiment of the present invention is not limited thereto. For example, the air passage holes 11 may be formed to be concentrated in a specific area.

For reference, the air supply device 20 may comprise an air compressor or the like which compresses air. The vacuum device 30 may comprise a vacuum pump that or the like which generates a negative pressure by lowering a sealed inner space to an atmospheric pressure or less. Furthermore, the hoses connecting the air supply device 20 and the vacuum device 30 to the individual air passage holes 11 have to be hermetically sealed. The valves that are mounted to the hoses and selectively switched may be preferably solenoid valves that are controlled by electrical signals. Also, the valves may be switched by a signal of a control unit 40.

Furthermore, each of distance measurement sensors 12 that measures a distance from the surface of the electrode base material 1 is disposed between the air passage holes 11 or to one side of each of the upper housing 10b and the lower housing 10b. The distance measurement sensors 12 are installed at at least two or more positions on each of the upper housing 10b and the lower housing 10a to continuously measure a distance between the upper housing 10b and the top surface of the electrode base material 1 and a distance between the lower housing 10a and the bottom surface of the electrode base material 1. Also, data measured by the distance measurement sensors 12 may be transmitted to the control unit 40. The control unit 40 may compare and calculate the received data to compare a degree of warpage, which is measured first, to a degree of warpage, which is measured later, while the electrode base material 1 moves, thereby monitoring the overall warpage shape, angle, and characteristics of the electrode base material 1 in real time. For reference, each of the distance measurement sensors 12 may preferably be a laser distance measurement device which emits a laser beam to the surface of the electrode base material 1 to measure a distance. However, the distance measurement sensor 12 may be used without any limitation if it is a non-contact type measurement device.

The control unit 40 determines whether to suction or inject air through each of the air passage holes 11 so that the electrode base material 1 enters the punching device 3 in a flat state according to the warpage of the electrode base material 1 to be monitored and controls the valves connected to the air supply device 20 or the vacuum device 30.

Here, the air discharged into the air passage holes 11 may be injected as hot air having a temperature higher than room temperature so that the electrode base material 1 increases in flexibility. That is, air heated within the air supply device 20 may be injected, or air heated by passing through a heating wire 11a provided at an inlet-side of the air passage hole 11 may be injected. Furthermore, hot air may be injected from the front air passage holes 11, which are disposed close to the unwinder 3, and room temperature air may be injected from the rear air passage holes 11, which are disposed close to the punching device 3, according to the warpage degree and the characteristics of the electrode base material 1. Also, since the air passage holes 11 are individually operated, as illustrated in FIG. 2, the air may be strongly injected at the front side and relatively weakly injected at the rear side.

Second Embodiment

A punching method for an electrode base material 1 provided as a second embodiment of the present invention is characterized in that the electrode base material 1 is continuously supplied to be punched and also is planarized before the punching.

That is, the punching method comprises a step of supplying an electrode base material 1 wound around a unwinder 2 to a punching device 3 while unwinding the electrode base material 1, a step of monitoring whether warpage of the electrode base material 1 occurs during movement of the electrode base material 1 to the punching device 3 to inject or suction air onto a surface of the electrode base material 1 when the warpage occurs so as to planarize the electrode base material 1, and a step of punching the planarized and entering electrode base material 1 by using the punching device 3.

According to the present invention, in the step of planarizing the electrode base material 1, a shape and degree of warpage of the electrode base material 1 may be continuously monitored, and while the electrode base material 1 moves, a value measured by a distance measurement sensor 12 disposed at a lower side and a value measured by a distance measurement sensor 12 disposed at an upper side may be compared and calculated. In addition, a control unit 40 may control air to be injected or suctioned according to the warpage state to planarize the electrode base material 1 according to a previously inputted logic.

According to the present invention having the above-described technical features, while the electrode base material 1 moves, air may be injected or suctioned onto the surface of the electrode base material 1 to planarize the electrode base material 1, thereby reducing an occurrence of defects during the punching process. Also, in the curl correcting device 10, since the air is injected or suctioned from each of the upper and lower sides of the electrode base material 1, the planarization may be realized more effectively than the structure in which the air is injected from one side.

Also, since the distance measurement sensor for measuring the distance from the surface of the electrode base material 1 is attached to each of the upper housing 10b and the lower housing 10a, and the control unit 40 for calculating and monitoring the degree of the warpage of the electrode base material 1 is provided, the air injection amount and the air suction amount may be actively controlled according to the degree of the warpage of the electrode base material 1. Furthermore, the hot air may be injected onto the surface of the electrode base material 1 to realize the planarization in the state in which the electrode base material 1 is more flexible.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A punching system configured to mold or cut an electrode base material into a predetermined shape, the electrode base material including an active material coated on a surface of a collector, the punching system comprising:

an unwinder configured to hold and unwind the electrode base material from an initial configuration in a form of a roll;
a punching device spaced a predetermined distance from the unwinder, the punching device being configured to mold or cut the electrode base material into the predetermined shape; and
a curl correcting device disposed between the unwinder and the punching device, the curl correcting device being configured to inject or suction air onto a surface of the electrode base material so as to planarize the electrode base material;
an upper housing disposed above a moving path of the electrode base material;
a lower housing disposed below the moving path of the electrode base material; and
a control unit configured to compare a distance between the upper housing and the surface of the electrode base material to a distance between the lower housing and the surface of the electrode base material, thereby calculating and monitoring a degree of warpage of the electrode base material.

2. The punching system of claim 1, wherein
a plurality of air passage holes through which the air is injected or suctioned are provided in each of the upper housing and the lower housing.

3. The punching system of claim 2, wherein the plurality of air passage holes are individually connected to an air supply device configured to inject the air and a vacuum device configured to suction the air so that each of the air passage holes is configured to independently suction or inject the air.

4. The punching system of claim 3, wherein each of the upper housing and the lower housing has one or more distance measurement sensors disposed thereon and configured to measure the respective distance from the surface of the electrode base material to the respective upper housing or lower housing.

5. The punching system of claim 4, wherein each of the upper housing and the lower housing has the respective one or more distance measurement sensors installed at at least two or more positions on each of the upper housing and the lower housing, and
the control unit is configured to compare a degree of the warpage, which is measured first, to a degree of the warpage, which is measured later, while the electrode base material moves to determine whether to suction or inject the air through each of the air passage holes.

6. The punching system of claim 4, wherein each distance measurement sensor comprises a laser distance measurement device that is configured to emit a laser beam to the surface of the electrode base material to measure the respective distance.

7. The punching system of claim 3, wherein the air supply device is configured to inject the air onto the surface of the electrode base material as hot air having a temperature higher than an ambient room temperature.

8. The punching system of claim 2, wherein the plurality of air passage holes are disposed to form a two-dimensional array of rows on a surface of each of the upper housing and the lower housing, the surface of the upper housing and the surface of the lower housing being configured to face the electrode base material.

9. A punching method for molding or cutting an electrode base material into a predetermined shape, the punching method comprising:

supplying the electrode base material from an unwinder to a punching device, the electrode base material having an initial configuration wound around the unwinder;

detecting a presence or an absence of a warpage of the electrode base material during movement of the electrode base material to the punching device; and injecting or suctioning air onto a surface of the electrode base material when the presence of the warpage is detected, so as to planarize the electrode base material, wherein the detecting of the presence or the absence of the warpage of the electrode base material is performed by comparing a value measured by a distance measurement sensor disposed at a lower side of the electrode base material to a value measured by a distance measurement sensor disposed at an upper side of the electrode base material while the electrode base material moves.

10. The punching method of claim 9, wherein the air injected onto the surface of the electrode base material is injected as hot air having a temperature higher than an ambient room temperature.

* * * * *